United States Patent
Noh

(10) Patent No.: US 7,996,042 B2
(45) Date of Patent: Aug. 9, 2011

(54) MOBILE COMMUNICATION TERMINAL AND METHOD FOR PROVIDING CALL-FORWARDING INFORMATION

(75) Inventor: Berm-Seok Noh, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 984 days.

(21) Appl. No.: 11/459,314

(22) Filed: Jul. 21, 2006

(65) Prior Publication Data

US 2007/0021150 A1   Jan. 25, 2007

(30) Foreign Application Priority Data

Jul. 21, 2005 (KR) ........................ 10-2005-0066385

(51) Int. Cl.
*H04B 1/38* (2006.01)

(52) U.S. Cl. ........ 455/558; 455/566; 455/417; 455/445; 455/435.1

(58) Field of Classification Search .................. 455/417, 455/414.1, 558, 566, 445, 412.1; 379/211.01, 379/93.17

See application file for complete search history.

(56) References Cited

U.S. PATENT DOCUMENTS

| 6,084,951 | A * | 7/2000 | Smith et al. ............ 379/93.17 |
| 6,671,523 | B1 * | 12/2003 | Niepel et al. ............. 455/558 |
| 6,959,207 | B2 * | 10/2005 | Keinonen et al. ........... 455/567 |
| 7,184,527 | B1 * | 2/2007 | Lin et al. ............... 379/93.17 |
| 7,848,781 | B2 * | 12/2010 | Bhat et al. ............... 455/558 |
| 7,907,968 | B2 * | 3/2011 | Silverbrook et al. ........ 455/557 |
| 2001/0051534 | A1 | 12/2001 | Amin |
| 2004/0038706 | A1 | 2/2004 | Wasser |
| 2005/0215242 | A1 * | 9/2005 | Black et al. ............... 455/417 |
| 2008/0123831 | A1 * | 5/2008 | Flensted-Jensen et al. ........... 379/212.01 |

FOREIGN PATENT DOCUMENTS

| CN | 1481135 | 3/2004 |
| CN | 1750691 | 3/2006 |
| JP | 62077748 | 4/1987 |
| JP | 7162528 | 6/1995 |
| JP | 9009354 | 1/1997 |
| JP | 2004007190 | 1/2004 |

* cited by examiner

*Primary Examiner* — Sharad Rampuria

(74) *Attorney, Agent, or Firm* — Lee, Hong, Degerman, Kang & Waimey

(57) ABSTRACT

A mobile communication terminal and for providing call-forwarding information are disclosed. The method includes transmitting a registration message or an origination message including user identity information to a network and receiving call-forwarding information of a corresponding subscriber included in an ACK message, thereby providing call-forwarding information interworked with the network and the mobile communication terminal. Accordingly, a user of the mobile communication terminal can precisely recognize accurate call-forwarding information in real time.

21 Claims, 3 Drawing Sheets

MOBILE COMMUNICATION TERMINAL AND METHOD FOR PROVIDING CALL-FORWARDING INFORMATION

CROSS-REFERENCE TO RELATED APPLICATIONS

Pursuant to 35 U.S.C. §119(a), this application claims the benefit of earlier filing date and right of priority to Korean Application No. 10-2005-0066385, filed on Jul. 21, 2005, the contents of which is hereby incorporated by reference herein in its entirety.

FIELD OF THE INVENTION

The present invention relates to a mobile communication terminal, and more particularly, to a mobile communication terminal and a method for providing call-forwarding information.

DESCRIPTION OF THE RELATED ART

A call-forwarding service refers to a service to connect an incoming call to another number inside the same subscription region. A conventional call-forwarding method of a mobile communication terminal for a call-forwarding service includes a call-forwarding BUSY type, a call-forwarding NOT ANSWER type, and a call-forwarding UNCONDITIONAL type.

When the user is not subscribed to a call-forwarding service, the call-forwarding method is set as a default call-forwarding type. The 'BUSY' type is used to perform call-forwarding to a set number while the user of the mobile communication terminal performs a call. The 'NOT ANSWER' type is used to perform call-forwarding to a set number when the user of the mobile communication terminal does not desire to receive a call. The 'UNCONDITIONAL' type is used to immediately perform call-forwarding to a set number without a condition.

The call-forwarding types can be displayed on a screen of the mobile communication terminal as icons having various shapes, or call-forwarding type icons. Hereinafter, the conventional method for displaying call-forwarding type icons on a screen of a mobile communication terminal according to a call-forwarding service subscription will be explained.

When a user subscribes a call-forwarding service by selecting a desired call-forwarding type from a menu of the mobile communication terminal, the mobile communication terminal transmits a call requesting a call-forwarding service subscription or a call-forwarding service change to a network. The network stores information related to call-forwarding, such as a call-forwarding type, in a home location register (HLR). The network then provides a call-forwarding service according to a call-forwarding type stored in the HLR.

The mobile communication terminal stores information related to a call-forwarding type selected upon subscribing to a call-forwarding service in a memory and displays a call-forwarding type icon matching the selected call-forwarding type on the screen of the mobile communication terminal when call-forwarding is performed. The call-forwarding type icon displayed on the screen of the mobile communication terminal is related to the information stored in the memory of the mobile communication terminal, which is not necessarily related to a call-forwarding service provided from the network.

Once a call-forwarding type set by the mobile communication terminal is registered in the HLR of the network, information related to the call-forwarding type is not transmitted to the mobile communication terminal since there is no protocol for exchanging call-forwarding information between the network and the mobile communication terminal. Therefore, when a user identity module (UIM) card which has been mounted in a mobile communication terminal and has number information of the mobile communication terminal, is replaced with a new UIM card, the user must re-subscribe or change a call-forwarding service before a call-forwarding type icon matching a selected call-forwarding type is displayed on a screen of the mobile communication terminal when call-forwarding is performed.

For example, when a first person, who has not previously subscribed to a call-forwarding service, subscribes to a call-forwarding service by selecting a call-forwarding BUSY type in the mobile communication terminal, the mobile communication terminal transmits a call requesting a call-forwarding service subscription to a mobile communication system. The mobile communication system then sets a call-forwarding type of the first person as 'BUSY', stores the selected call-forwarding type in the HLR and provides a call-forwarding service of 'BUSY' type. The mobile communication terminal stores the call-forwarding 'BUSY' type in the memory and displays an icon corresponding to the call-forwarding 'BUSY' type on a screen of the mobile communication terminal upon performing call-forwarding.

When the UIM card mounted in the mobile communication terminal is replaced by a different UIM card, such as a UIM card of a second person who has subscribed to a call-forwarding service of 'NOT ANSWER' type, the mobile communication system recognizes that the user of the mobile communication terminal is the second person via a registration process and provides a call-forwarding service of 'NOT ANSWER' type. However, since the mobile communication terminal does not recognize that the call-forwarding type has changed to 'NOT ANSWER' type from 'BUSY' type, the icon of 'BUSY' type previously stored in the memory on the screen is displayed upon performing call-forwarding. Therefore, the icon displayed on the screen of the mobile communication terminal does not match the selected call-forwarding type.

According to the conventional method, when the UIM card mounted in a mobile communication terminal is replaced, the mobile communication terminal cannot recognize whether a user is subscribed to a different call-forwarding service corresponding to the new UIM card. Therefore, the conventional method cannot accurately display call-forwarding information matching a phone number of the new UIM card on a screen.

SUMMARY OF THE INVENTION

One object of the present invention is to provide a mobile communication terminal and a method for providing call-forwarding information interworked with a network. Another object of the present invention is to provide a mobile communication terminal and a method for providing call-forwarding information consistent with call-forwarding subscription information of a UIM card mounted therein.

In one aspect of the present invention, a mobile communication terminal is provided. The terminal includes a transceiver adapted to transmit and receive signals from a network, a storage unit adapted to store call-forwarding information, a user identity module (UIM) unit adapted to receive a UIM card and a controller adapted to receive call-forwarding information from the network via the transceiver unit and to output call-forwarding information corresponding to subscription information related to the UIM card received by the UIM unit.

It is contemplated that the controller is further adapted to include subscription information related to the UIM card received by the UIM unit in at least one of a registration message and an origination message transmitted to the network. It is further contemplated that the controller is further adapted to receive an ACK message from the network via the transceiver unit, the ACK message including call-forwarding information corresponding to the subscription information.

It is contemplated that the subscription information includes a user identity parameter including a user identity number. It is further contemplated that the controller is further adapted to extract the call-forwarding information from the ACK message and to store the extracted call-forwarding information in the storage unit.

It is contemplated that the controller is further adapted to store the extracted call-forwarding information in the storage unit and output the corresponding call-forwarding information instantaneously. It is further contemplated that the controller is further adapted to include a call-forwarding type icon and an indication that call-forwarding is performed in the output call-forwarding information, the indication at least one of a message output to a display unit and an audible alert output to a speaker unit.

It is contemplated that the call-forwarding type icon includes an emoticon having various shapes and motions according to a selected call-forwarding type. It is further contemplated that the controller is further adapted to output the extracted call-forwarding information when a call-forwarding process is performed.

it is contemplated that the controller is further adapted to include a call-forwarding type icon and an indication that call-forwarding is performed in the output call-forwarding information, the indication at least one of a message output to a display unit and an audible alert output to a speaker unit. It is further contemplated that the call-forwarding type icon includes an emoticon having various shapes and motions according to a selected call-forwarding type.

It is contemplated that the controller is further adapted to output the call-forwarding information stored in the storage unit without receiving call-forwarding information from the network when the information of the UIM card received by the UIM unit is identical to UIM card information stored in the storage unit. It is further contemplated that the call-forwarding information indicates whether a call-forwarding service has been subscribed to and a call-forwarding type.

It is contemplated that the call-forwarding type includes one of BUSY, NOT ANSWER, UNCONDITIONAL and DEFAULT. It is further contemplated that the mobile communication terminal further includes an input means including at least one of a keypad, a microphone and a touch screen and an input port connected to an external input means and adapted to receive information. Preferably, the mobile communication terminal further includes an output means including at least one of a display unit and a speaker unit and an output port connected to an external display device and adapted to output information.

In another aspect of the present invention, a method for providing call-forwarding information in a mobile communication terminal is provided. The method includes transmitting at least one of a registration message and an origination message to a network, the least one of a registration message and an origination message including a user identity parameter, receiving an ACK message from the network, the ACK message including call-forwarding information corresponding to the user identity parameter and outputting call-forwarding information corresponding to the call-forwarding information in the ACK message, the call-forwarding information output either instantaneously or when performing a call-forwarding process.

It is contemplated that the user identity parameter is related to a UIM card mounted in the mobile communication terminal and includes a user identity number. It is further contemplated that the call-forwarding information indicates whether a call-forwarding service has been subscribed to and a call-forwarding type.

It is contemplated that the call-forwarding type includes one of BUSY, NOT ANSWER, UNCONDITIONAL and DEFAULT. It is further contemplated that the method further includes including a call-forwarding type icon and an indication that call-forwarding is performed in the output call-forwarding information, the indication at least one of a message output to a display unit and an audible alert output to a speaker unit. It is further contemplated that the call-forwarding type icon includes an emoticon having various shapes and motions according to a selected call-forwarding type.

In another aspect of the present invention, a method for providing call-forwarding information in a mobile communication terminal is provided. The method includes reading information of a UIM card mounted in the mobile communication terminal upon initialization, extracting a user identity parameter from the read UIM card information and storing call-forwarding information corresponding to the user identity parameter, determining whether a user identity parameter of a UIM card mounted in the mobile communication terminal is identical to the stored user identity parameter, the determination performed when one of a registration message and an origination message is to be transmitted and outputting the stored call-forwarding information if the user identity parameter of the mounted UIM card is identical to the stored user identity parameter.

It is contemplated that the user identity parameter includes a user identity number. It is further contemplated that the call-forwarding information includes an indication of whether a call-forwarding service is subscribed to and a call-forwarding type.

It is contemplated that the call-forwarding type includes one of BUSY, NOT ANSWER, UNCONDITIONAL and DEFAULT. It is further contemplated that the method further includes including a call-forwarding type icon and an indication that call-forwarding is performed in the output call-forwarding information, the indication at least one of a message output to a display unit and an audible alert output to a speaker unit.

It is contemplated that the call-forwarding type icon includes an emoticon having various shapes and motions according to a selected call-forwarding type. It is further contemplated that the method further includes transmitting the one of a registration message and an origination message to a network if the user identity parameter of the mounted UIM card is not identical to the stored user identity parameter, the one of a registration message and an origination message including the user identity parameter of the mounted UIM card, receiving an ACK message from the network, the ACK message including call-forwarding information corresponding to the user identity parameter and outputting call-forwarding information corresponding to the call-forwarding information included in the received ACK message.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will be made in detail to the preferred embodiments of the present invention, examples of which are illustrated in the accompanying drawings. Preferred embodiments of the present invention will be explained in more detail with reference to the attached drawings.

Figure 1:
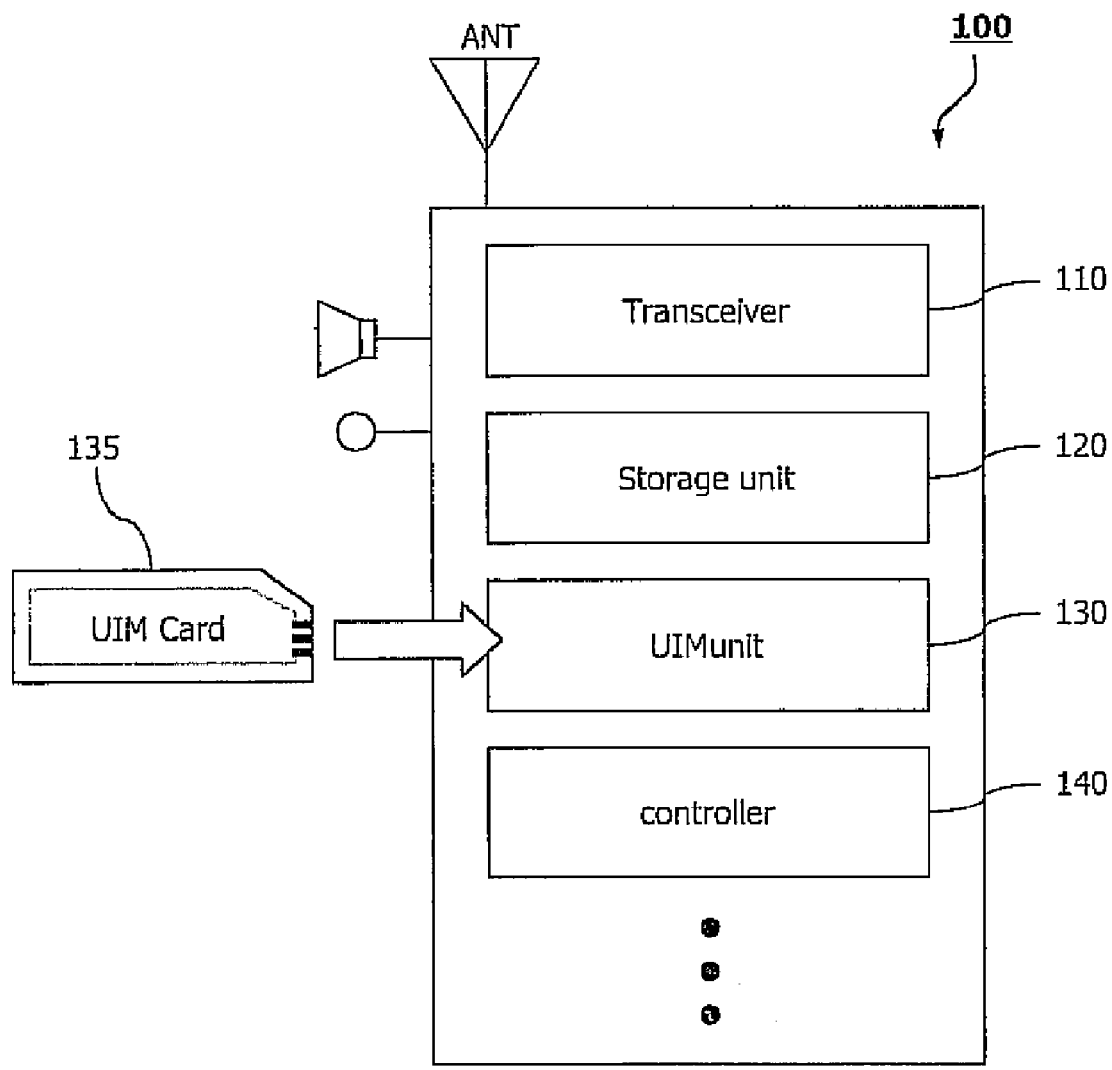
FIG. 1 illustrates a mobile communication terminal for providing call-forwarding information according to one embodiment of the present invention.

FIG. 1 illustrates a mobile communication terminal 100 for providing call-forwarding information according to one embodiment of the present invention. As illustrated in FIG. 1, the mobile communication terminal 100 includes a transceiver 110 for receiving and transmitting signals with a network; a storage unit 120 for storing data including call-forwarding information; a UIM unit 130 for receiving a user identity module (UIM) card 135; and a controller 140 for controlling the other components to receive call-forwarding information corresponding to subscription information of the UIM card 135 mounted in the UIM unit 130 from the network via the transceiver 110 and output corresponding call-forwarding information when a call-forwarding process is performed.

The mobile communication terminal 100 can also include an input means, such as a keypad, a microphone or a touch screen, and an input port connected to an external input means, such as a keyboard, for entering information. The mobile communication terminal 100 can further include an output means, such as a display panel or a speaker, and an output port connected to an external display device, such as a television or a monitor, for outputting information.

The controller 140 transmits a registration message or an origination message to a network, the message including a user identity parameter such as a user's own number of an UIM card mounted at the UIM unit, and receives call-forwarding information corresponding to the user identity parameter from the network via, for example, an ACK message. When the mobile communication terminal 100 is turned on or the mobile communication terminal moves to a service region of another base station or a setting of the mobile communication terminal is changed by a user by replacing the UIM card, a registration with the network is performed either periodically or according to an indication from a base station.

The controller 140 transmits a registration message to the network via the transceiver 110. When the mobile communication terminal 100 originates a call, the controller 140 transmits the origination message to the network via the transceiver 110.

Upon transmitting a registration message or an origination message to the network, the controller 140 includes a user identity parameter of the UIM card 135 mounted at the UIM unit 130. The network, upon receiving the registration message or origination message, selects call-forwarding information of a corresponding subscriber stored in a home location register (HLR) based on the user identity parameter and transmits the call-forwarding information to the mobile communication terminal 100. The controller 140 receives, for example, an ACK message including the call-forwarding information from the network via the transceiver 110, extracts the call-forwarding information from the ACK message and stores the extended call-forwarding information in the storage unit 120.

At the same time, the controller 140 outputs call-forwarding information matching the stored call-forwarding information. For example, the controller 140 displays a call-forwarding type icon matching the stored call-forwarding information or outputs a text message on a display or voice via a speaker indicating the stored call-forwarding information. The controller 140 may also blink a lamp or use vibration to inform a user that call-forwarding is being performed. The call-forwarding type icon can be set as an emoticon having various shapes and motions.

The controller 140 determines whether information of the UIM card 135 mounted in the UIM unit 130 is identical to UIM card information stored in the storage unit 120. If the information of the UIM card 135 mounted in the UIM unit 130 is identical to the UIM card information stored in the storage unit 120, a user identity parameter of the UIM card 135 may not be included in the registration message or the origination message.

That is, when the information of the UIM card 135 mounted in the UIM unit 130 is identical to the UIM card information stored in the storage unit 120, the controller outputs the call-forwarding information stored in the storage unit without receiving call-forwarding information from the network. Toward this end, the storage unit 120 may store UIM card information including a user identity parameter, such as a user identity number, according to the controller 140.

Specific fields shown in the following table may be added to an ACK message as call-forwarding-related fields. In this way, call-forwarding information of a corresponding subscriber, such as a user identity parameter stored in the home location register (HLR) of the network, may be included in the ACK message. This process can be performed, for example, by a switching center of the network.

| CALL-FORWARDING TYPE | FIELD VALUE |
|---|---|
| BUSY | 001 |
| NOT ANSWER | 010 |
| UNCONDITIONAL | 011 |
| DEFAULT | 100 |

Figure 2:
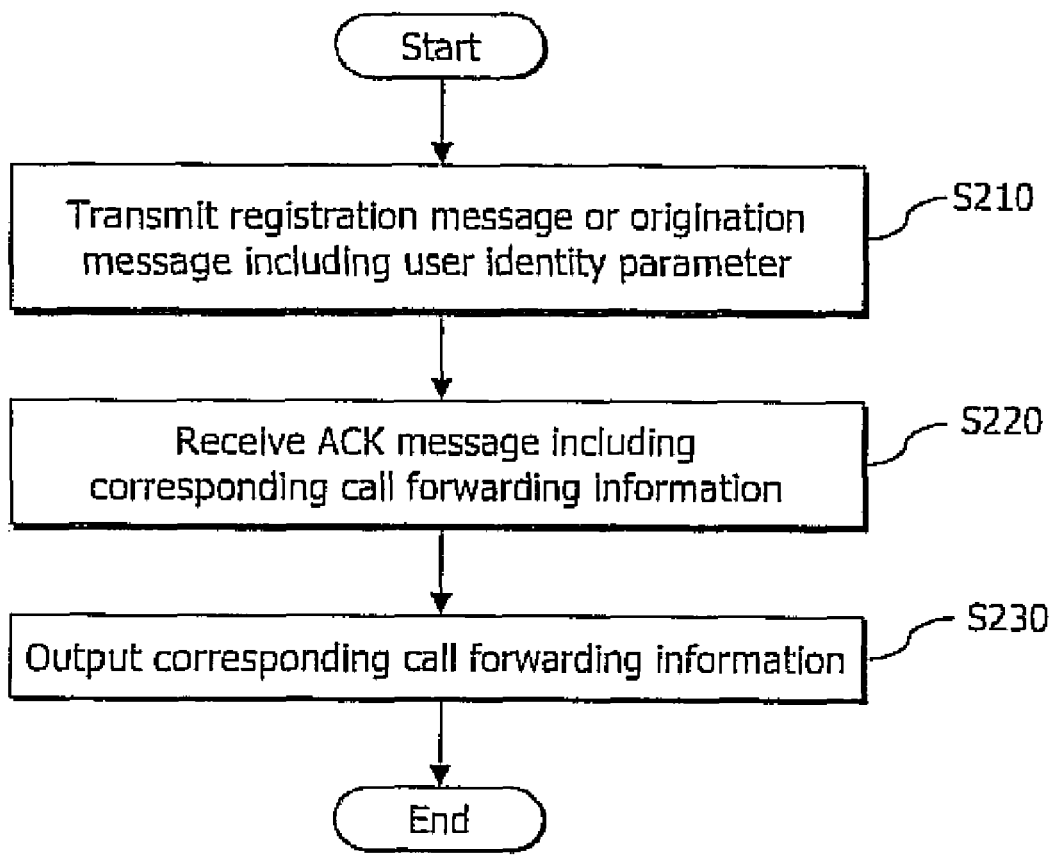
FIG. 2 is a flowchart indicating a method for providing call-forwarding information in a mobile communication terminal according to one embodiment of the present invention.

FIG. 2 is a flowchart illustrating a method for providing call-forwarding information in a mobile communication terminal 100 according to one embodiment of the present invention. As illustrated in FIG. 2, when transmitting a registration message or an origination message to the network, the mobile communication terminal 100 adds a user identity parameter to the message (S210).

The mobile communication terminal 100 then receives an ACK message including call-forwarding information corresponding to the user identity parameter from the network (S220) and outputs call-forwarding information corresponding to the call-forwarding information included in the ACK message either instantaneously or upon performing a call-forwarding process (S230). Accordingly, the user of the mobile communication terminal can certify whether a call-forwarding service has been subscribed to, which type of call-forwarding has been selected, whether call-forwarding is being performed and how call-forwarding is being performed.

Figure 3:
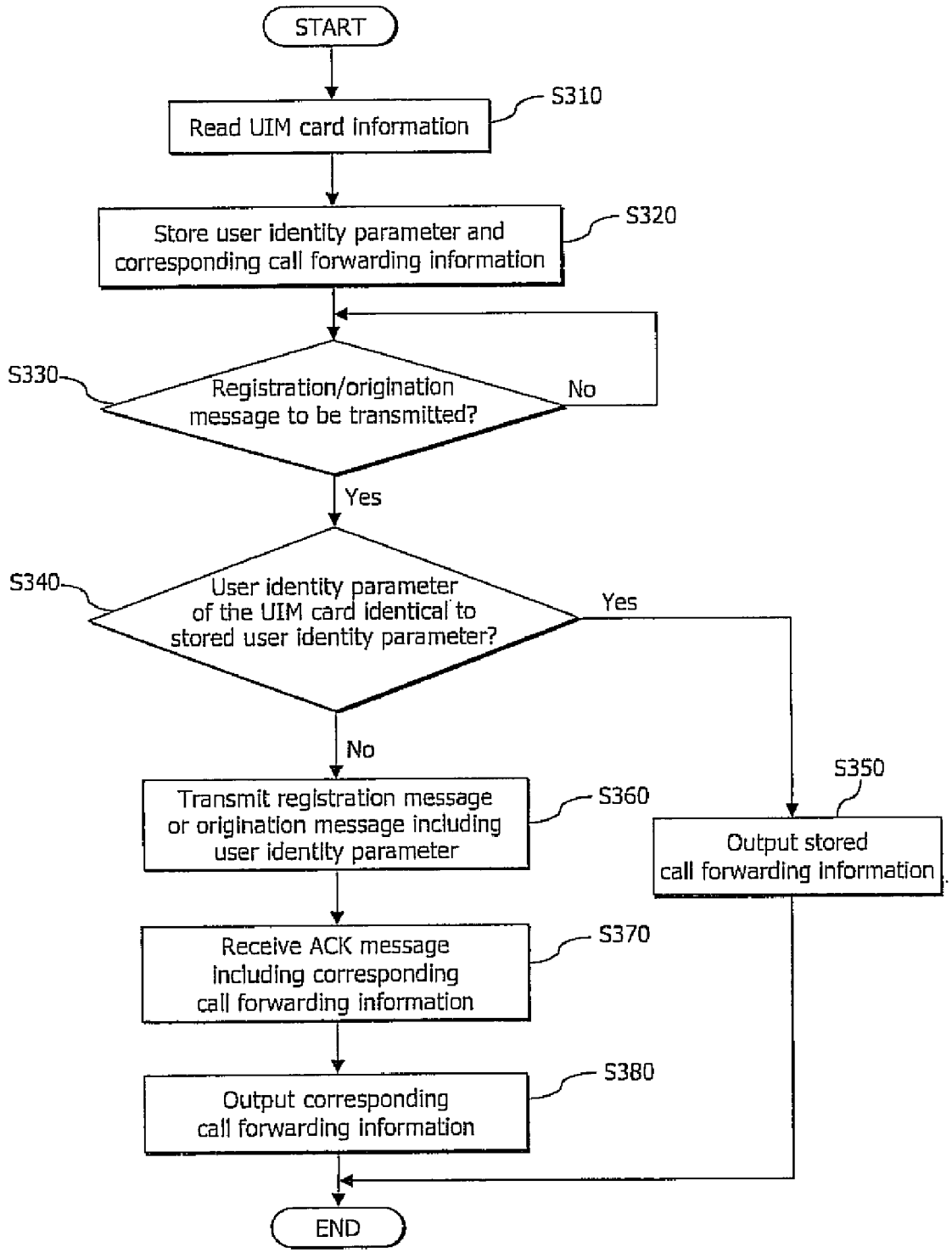
FIG. 3 is a flowchart illustrating a method for providing call-forwarding information in a mobile communication terminal according to another embodiment of the present invention.

FIG. 3 is a flowchart illustrating a method for providing call-forwarding information in a mobile communication terminal 100 according to another embodiment of the present invention. As illustrated in FIG. 3, the mobile communication terminal 100 reads information of a UIM card 135 mounted in the mobile communication terminal 100 upon initialization (S310). The mobile communication terminal 100 then extracts a user identity parameter from the read UIM card information and stores call-forwarding information corresponding to the user identity parameter (S320).

The mobile communication terminal 100 determines whether a registration message or an origination message is to be transmitted (S330). If a registration message or an origination message is to be transmitted, the mobile communication terminal 100 then determines whether a user identity parameter of the mounted UIM card 135 is identical to a stored user identity parameter (S340).

If the user identity parameter of the mounted UIM card 135 is identical to the stored user identity parameter the mobile communication terminal 100 outputs the stored call-forwarding information either instantaneously upon performing a call-forwarding process (S350). However, if the user identity parameter of the mounted UIM card 135 is not identical to the stored user identity parameter, the mobile communication terminal 100 adds a user identity parameter to the registration message or origination message and transmits the message to the network (S360), receives an ACK message including call-forwarding information corresponding to the user identity parameter from the network (S370) and outputs call-forwarding information corresponding to the call-forwarding information included in the ACK message either instantaneously or upon performing a call-forwarding process (S380).

According to the present invention, a registration message or an origination message including a user identity parameter is transmitted to the network and call-forwarding information of a corresponding subscriber included in an ACK message is utilized in order to provide call-forwarding information interworked with the network and the mobile communication terminal. As the result, the user of the mobile communication terminal can precisely recognize accurate call-forwarding information in real time.

Furthermore, in the present invention, call-forwarding information corresponding to current user identity information is provided. Therefore, the related art problems of not being able to determine whether a user has subscribed to a call-forwarding service corresponding to a newly replaced UIM card and a selected call-forwarding type and not being able to output call-forwarding information matching with a phone number of the UIM card can be alleviated.

As the present invention may be embodied in several forms without departing from the spirit or essential characteristics thereof it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalents of such metes and bounds are therefore intended to be embraced by the appended claims.

What is claimed is:

1. A mobile communication terminal, comprising:
a display unit configured to display call-forwarding information;
a transceiver unit adapted to transmit and receive signals from a network;
a storage unit adapted to store call-forwarding information;
a user identity module (UIM) unit adapted to receive a UIM card; and
a controller adapted to receive call-forwarding information from the network via the transceiver unit, to output call-forwarding information via the display unit,
wherein the call-forwarding information corresponds to subscription information related to the UIM card received by the UIM unit, and
wherein the controller includes subscription information associated with the UIM card received by the UIM unit in at least a registration message or an origination message transmitted to the network if the subscription information associated with the UIM card received by the UIM unit is identical to subscription information stored in the storage unit,
wherein the call-forwarding information indicates whether a call-forwarding service has been subscribed to and a call-forwarding type comprising one of BUSY, NOT ANSWER, UNCONDITIONAL and DEFAULT.

2. The mobile communication terminal of claim 1, wherein the controller is further adapted to receive an ACK message from the network via the transceiver unit, the ACK message comprising the call-forwarding information corresponding to the subscription information.

3. The mobile communication terminal of claim 2, wherein the subscription information comprises a user identity parameter including a user identity number.

4. The mobile communication terminal of claim 2, wherein the controller is further adapted to extract the call-forwarding information from the ACK message and to store the extracted call-forwarding information in the storage unit.

5. The mobile communication terminal of claim 4, wherein the controller is further adapted to store the extracted call-forwarding information in the storage unit and output the corresponding call-forwarding information instantaneously.

6. The mobile communication terminal of claim 5, wherein the controller is further adapted to include a call-forwarding type icon and an indication that call forwarding is performed in the output call-forwarding information, wherein the indication comprises at least one of a message output to the display unit and an audible alert output to a speaker unit.

7. The mobile communication terminal of claim 6, wherein the call forwarding type icon comprises an emoticon having various shapes and motions according to a selected call-forwarding type.

8. The mobile communication terminal of claim 4, wherein the controller is further adapted to output the extracted call-forwarding information when a call-forwarding process is performed.

9. The mobile communication terminal of claim 8, wherein the controller is further adapted to include a call-forwarding type icon and an indication that call forwarding is performed in the output call-forwarding information, wherein the indication comprises at least one of a message output to the display unit and an audible alert output to a speaker unit.

10. The mobile communication terminal of claim 9, wherein the call forwarding type icon comprises an emoticon having various shapes and motions according to a selected call-forwarding type.

11. The mobile communication terminal of claim 1, wherein the controller is further adapted to output the call-forwarding information stored in the storage unit without receiving call-forwarding information from the network when the information of the UIM card received by the UIM unit is identical to UIM card information stored in the storage unit.

12. The mobile communication terminal of claim 1, further comprising:
an input means comprising at least one of a keypad, a microphone and a touch screen;
and an input port connected to an external input means and adapted to receive information.

13. The mobile communication terminal of claim 1, further comprising:
a speaker unit configured to provide audio output; and
an output port connected to an external display device and adapted to output information.

14. A method for providing call-forwarding information in a mobile communication terminal, the method comprising:
transmitting at least a registration message or an origination message to a network, the
registration message or the origination message comprising a user identity parameter;
receiving an ACK message from the network, the ACK message comprising call forwarding information corresponding to the user identity parameter; and
outputting call-forwarding information via a display unit corresponding to the call forwarding information in the ACK message, wherein the call-forwarding information is output instantaneously when the call-forwarding information is processed,
wherein the user identity parameter is associated with a UIM card mounted in the mobile communication terminal and comprises a user identity number, and
wherein the transmission of at least the registration message or the origination message to the network is performed if the user identity parameter associated with the UIM card mounted in the mobile communication terminal is identical to a user identity parameter stored in the mobile communication terminal,
wherein the call-forwarding information indicates whether a call-forwarding service has been subscribed to and a call-forwarding type comprising one of BUSY, NOT ANSWER, UNCONDITIONAL and DEFAULT.

15. The method of claim 14, further comprising including a call-forwarding type icon and an indication that call-forwarding is performed in the output call forwarding information, wherein the indication comprises at least one of a message output to the display unit and an audible alert output to a speaker unit.

16. The method of claim 15, wherein the call-forwarding type icon comprises an emoticon having various shapes and motions according to a selected call-forwarding type.

17. A method for providing call-forwarding information in a mobile communication terminal, the method comprising:
reading information of a user identity module (UIM) card mounted in the mobile communication terminal upon initialization;
extracting a first user identity parameter from the read UIM card information and storing call-forwarding information corresponding to the user identity parameter;
determining whether the user identity parameter of the UIM card mounted in the mobile communication terminal is identical to a second user identity parameter previously stored in the mobile communication terminal, the determination performed when at least a registration message or an origination message is to be transmitted,
wherein the stored call-forwarding information is output via a display unit if the first user identity parameter of the mounted UIM card is identical to the second user identity parameter previously, and
wherein transmission of at least the registration message or the origination message comprises the first user identity parameter of a UIM card mounted in the mobile communication terminal if the first user identity parameter of the UIM card mounted in the mobile communication terminal is not identical to the second user identity parameter,
wherein the call-forwarding information indicates whether a call-forwarding service has been subscribed to and a call-forwarding type comprising one of BUSY, NOT ANSWER, UNCONDITIONAL and DEFAULT.

18. The method of claim 17, wherein the first user identity parameter and the second user identity parameter comprise a user identity number.

19. The method of claim 17, further comprising including a call-forwarding type icon and an indication that call-forwarding is performed in the output call forwarding information, wherein the indication comprises at least one of a message output to the display unit and an audible alert output to a speaker unit.

20. The method of claim 19, wherein the call-forwarding type icon comprises an emoticon having various shapes and motions according to a selected call-forwarding type.

21. The method of claim 17, further comprising:
receiving an ACK message from the network, the ACK message including the call forwarding information corresponding to the user identity parameter; and
outputting the call-forwarding information corresponding to the call-forwarding information included in the received ACK message via the display unit.

* * * * *